United States Patent Office 3,354,462
Patented Nov. 21, 1967

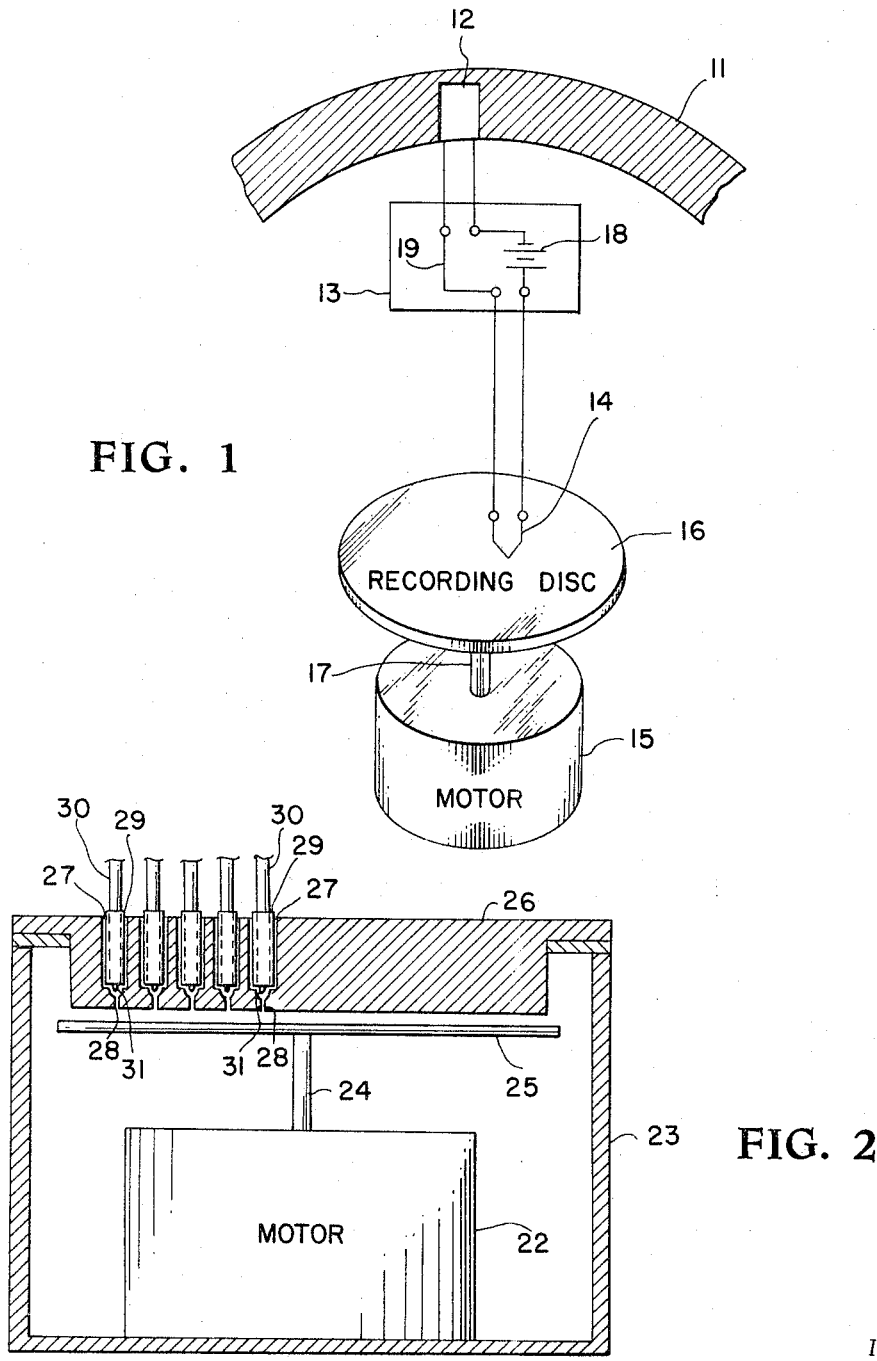

3,354,462
EVENT RECORDER
James M. Russell III, Newport News, and William E. Fox, Yorktown, Va., assignors to the United States of America as represented by the Administrator of the National Aeronautics and Space Administration
Filed Dec. 30, 1965, Ser. No. 517,858
7 Claims. (Cl. 346—50)

ABSTRACT OF THE DISCLOSURE

The event recorder has a constant speed motor which rotates a recording disc. An ignitable coated wire that produces carbon when subjected to an electrical current is positioned immediately above the recording disc. When an event occurs, a current is energized causing carbon to be deposited on the disc. The angular position of the carbon spot with respect to a known reference mark indicates the time of the event.

---

The invention described herein was made by employees of the United States Government and may be manufactured and used by or for the Government for governmental purposes without the payment of any royalties thereon or therefor.

The invention relates generally to a recording device and more specifically concerns a data storage system that will accurately and reliably record event data during reentry of a spacecraft into the earth's atmosphere.

There are two ways in which event information on a spacecraft can be transmitted to earth. First, the event information can be telemetered back to earth or second the event information can be recorded on the spacecraft and the spacecraft recovered after it enters the earth's atmosphere. The latter method of data acquisition appears to be preferable for experiments where attempts at extremely high reentry velocities are being made since, in general, the use of onboard data storage instruments allow decreased payload weight due to the elimination of the sometimes heavy and bulky telemetry systems.

Previous devices used for data storage during flight are tape recorders and magnetic core storage systems. Both tape recorders and magnetic storage systems have some unattractive features. Tape recorders are delicate instruments while magnetic core storage systems are complex and require many electronic components. Also, both instruments are relatively large and heavy.

It is therefore an object of this invention to provide a recording device for recording event information during the reentry phase of a space flight.

Another object of this invention is to provide a recording device that is not adversely affected by the reentry environment of a space flight.

A further object of this invention is to provide a simple, compact, lightweight recording device for use on a spacecraft.

Still another object of this invention is to provide a unique device for recording the happening of events.

In accomplishing these and other objects, this invention consists essentially of a constant speed motor, a recording disc, a coated wire which ignites when a pulse of current is passed through it, a voltage source, a collimating nozzle, and means for applying a voltage source to the coated wire upon the happening of an event. The constant speed motor rotates the recording disc which is in close proximity to the coated wire. When a specified event occurs the voltage source is applied to the coated wire. The resulting pulse of current through the wire causes it to ignite and burn the coating. As a result, carbon is produced which passes through the collimating nozzle onto the recording disc forming a carbon spot. The angular position of this carbon spot with respect to a reference mark previously placed on the disc indicates the time at which the event occurred.

Other objects and advantages of this invention will further become apparent hereinafter and in the drawings, in which:

FIG. 1 is a schematic drawing of a preferred embodiment of this invention; and

FIG. 2 is a cross-sectional view of a partial practical embodiment of this invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the schematic drawing in FIG. 1 of the embodiment of the invention selected for illustration, the number 11 designates the outside wall of a spacecraft. Embedded in wall 11 is a sensor 12 that is to sense an event which is to be recorded. Sensor 12 can be an ablation-type sensor in which case the sensor acts as an open switch until the outside surface of wall 11 ablates to the sensor, then it acts as a closed switch; or sensor 12 can be any other type of sensor. The event that is to be sensed dictates the location of sensor 12; therefore, it might be located at places other than in the wall of the spacecraft. The output from sensor 12 is connected to a signal conditioner 13. The output from conditioner 13 is connected across a wire 14 that ignites when a pulse of current is passed through it. Wire 14 can be composed of palladium and aluminum in intimate contact with each other so that when heated to the melting point of the aluminum an exothermic reaction occurs; or it can be composed of any type of material that will produce an exothermic reaction when a pulse of current is applied to it. Wire 14 is coated with a material (such as powder) that yields a liberal amount of carbon when burned. A constant speed motor 15 rotates a recording disk 16 by means of a shaft 17. Recording disk 16 is located close to wire 14 so that when wire 14 ignites and its coating burns the carbon therefrom is deposited on the surface of the recording disc. Recording disc 16 is made from any low density material that presents a vivid visual display of a carbon spot, that can withstand high temperatures without destruction and that will not react with salt water.

Signal conditioner 13 can be any device that will apply a pulse of current to wire 14 in response to a signal from the sensor. For example, if sensor 12 acts as a switch, signal conditioner 13 can be a four terminal device with a voltage source 18 connected between two of its terminals and with its other two terminals connected together by a wire 19. However, if sensor 12 produces some other type of output, then signal conditioner 13 would have to be something more than just a voltage source. The type of sensor and signal conditioner used is not considered to be a part of this invention, and could therefore be any device or combination of devices that will produce a pulse upon the happening of an event.

During operation of the recorder shown in FIG. 1, motor 15 is rotating recording disc 16 at a constant speed. When the event that is to be recorded happens sensor 12 and signal conditioner 13 act together to produce a pulse of current that is passed through wire 14. This pulse of current ignites wire 14 causing the coating on the wire to burn and produce carbon. This carbon is deposited on recording disc 16 in the form of a carbon spot. The angular position of the carbon spot with respect to a reference mark previously placed on the disc is an indication of the time that the event happened.

Referring now to FIG. 2 there is shown a practical embodiment of the invention in which several events can be recorded on the same recording disc. A constant speed motor 22 is mounted inside a suitable enclosure 23. Motor 22 rotates a shaft 24 which is attached to recording disc 25. A plate 26 is suitably attached to enclosure 23 so that the lower surface of it is in close proximity to recording disc 25. Several holes 27 are drilled in the upper surface of plate 26 such that each hole narrows into a funnel shape to form a collimating nozzle 28 at the lower surface of plate 26. An electrically insulating cylinder 29 is inserted into each hole 27 to its funnel shape. A two-wire cable 30 with a coated wire 31 connected to its end is inserted into each insulating cylinder 29 such that the wire 31 extends into the funnel shape of hole 27. Wires 31 are identical to the wire 14 in FIG. 1. Each of the cables 30 is attached to a separate signal conditioner and sensor similar to the ones shown in FIG. 1. Consequently, when a pulse of current is received through a cable 30 from its signal conditioner, wire 31 ignites and burns its coating thereby producing carbon. This carbon passes through the associated collimating nozzle 31 and makes a carbon spot on recording disc 25. The distance of the carbon spot from the center of recording disc 25 indicates the event and the angular position of the carbon spot with respect to a reference spot indicates the time of the event. Even though only five recording means are shown in FIG. 2, any number can be used without departing from the spirit or scope of the invention. Also a cylindrical, a spherical, or a two-ended recording surface could be used in place of recording surface 25 without departing from this invention.

Significant advantages of the event recorder that constitutes this invention include its simplicity and inherent reliability. Also the recorder is of small physical size and light weight making it preferable for use in recoverable payloads where weight and size are prime considerations. In addition, the data recorded will not be destroyed even if the record is subjected to temperatures as high as 700° F.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, certain features of the invention may be utilized independently of the use of other features, all without departing from the spirit or scope of the invention as defined in the subjoined claims. Even though this invention was made for use during the reentry phase of a space flight, it has other uses on and off of a spacecraft.

What is claimed is:

1. An event recorder comprising: a moving recording surface; means in close proximity to said recording surface for generating carbon when a pulse of electrical current is passed through it; and means responsive to an event for passing a pulse of electrical current through said means for producing carbon whereby the location of the resulting carbon spot on said recording surface indicates the time of the event.

2. An event recorder comprising: a recording disc; a constant speed motor connected to said recording disc to rotate it at a constant speed; a coated wire, located in close proximity to said recording disc, that will ignite when a pulse of current passes through it and burn said coating to form carbon; a voltage source; and means responsive to the happening of an event for applying said voltage source to said coated wire whereby when said event happens a pulse of current is passed through said coated wire causing it to ignite and burn said coating to form carbon which is deposited on said recording disc to form a carbon spot thereby indicating the time at which said event occurred.

3. An event recorder in accordance with claim 2 wherein a collimating nozzle directs said formed carbon onto a small area of said recording disc.

4. An event recorder in accordance with claim 2 wherein a plurality of events are recorded on said recording disc including separate coated wires and separate means for applying said voltage source to said coated wires for each event with each coated wire located at a different distance from the center of said recording disc whereby the distance of a carbon spot from the center of the rerecording disc will indicate the event and the angular position of the carbon spot will indicate the time of the event.

5. An event recorder comprising: a moving recording surface; a coated wire, located in close proximity to said recording surface that will ignite when a pulse of current passes through it and burn said coating to form carbon; a voltage source; and means responsive to the happening of an event for applying said voltage source to said coated wire whereby when said event happens a pulse of current is passed through said coated wire causing it to ignite and burn said coating to form carbon which is deposited on said recording surface to form a carbon spot thereby indicating the time at which said event occurred.

6. An event recorder in accordance with claim 5 wherein a collimating nozzle directs said formed carbon onto a small area of said recording surface.

7. An event recorder in accordance with claim 5 wherein a plurality of events are recorded on said recording surface including separate coated wires and separate means for applying said voltage source to said coated wires for each event with each coated wire located at a different point on a line transverse to the movement of the recording surface whereby the position of a carbon spot will indicate both the event and the time of the event.

References Cited

UNITED STATES PATENTS

| | | | |
|---|---|---|---|
| 892,292 | 6/1908 | McLaughlin | 346—102 X |
| 2,071,967 | 2/1937 | Bungner | 346—146 |
| 2,173,741 | 9/1939 | Wise et al. | 346—74 |
| 3,074,065 | 1/1963 | Orgill | 346—45 |

RICHARD B. WILKINSON, *Primary Examiner.*

J. W. HARTARY, *Assistant Examiner.*